May 3, 1927.

A. O. AUSTIN 1,626,776

ELECTRICAL CONDUCTOR WITH REENFORCING CORES

Filed June 25, 1924  2 Sheets-Sheet 1

INVENTOR
Arthur O. Austin
BY Nissen & Crane
ATTORNEYS

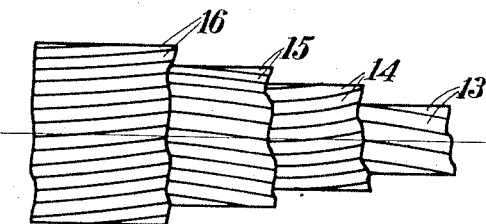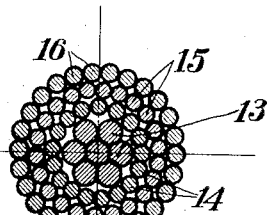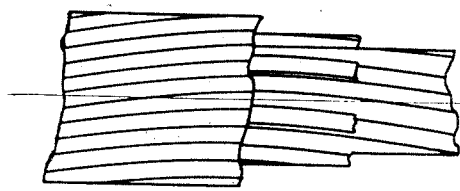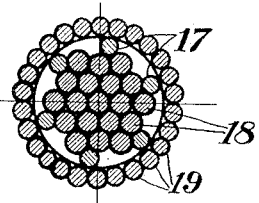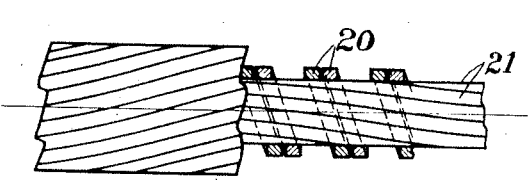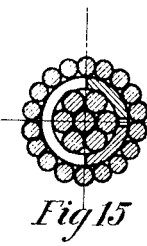

Patented May 3, 1927.

1,626,776

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

ELECTRICAL CONDUCTOR WITH REENFORCING CORE.

Application filed June 25, 1924. Serial No. 722,203.

This invention relates to conductor lines for electric currents and has for its object the provision of such conductors which shall be efficient in electrical conductivity and mechanical strength and which shall be of improved construction and operation.

The invention is exemplified in the combination and arrangement of parts shown in the accompanying drawings and described in the following specifications and it is more particularly pointed out in the appended claims.

In the drawings—

Figs. 10 and 11 are views similar to Figs. 2 and 3 showing another form of the invention.

Figs. 12 and 13 are views similar to Figs. 2 and 3 showing another form of the invention.

Figs. 14 and 15 are views similar to Figs. 2 and 3 showing another form of the invention.

Figure 1:
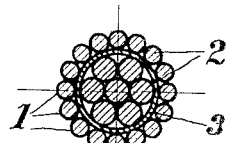
Fig. 1 is a transverse section of a conductor showing one embodiment of the present invention.

In electrical conductors the strength of the conductor is an important factor in the economy of transmission lines. A conductor having a high strength compared to its weight permits the use of longer spans, thus permitting a great saving in towers and insulators.

Unfortunately some of the best commercial conductors, such as copper and aluminum are rather soft metals; hence, the spans are limited by these metals unless they are used in conjunction with a metal of higher strength such as steel. The preferred construction is to use the steel core in the center to provide additional strength and outer strands which have a high conductivity. It is evident that if the mechanical strength of the steel core is affected in any way, as by corrosion, the mechanical reliability of the conductor will be impaired. It is also, important that the core have no effect on the mechanical or electrical properties of the better conducting layers as this would be detrimental to the mechanical strength of the conductor or to its conductivity.

In high tension transmission lines there is likely to be electrolyte formed due to static discharges or to the deposit of salts from dust. Where there is a difference in the electromotive force between the different metals composing a conductor, the electrolytic action may tend to destroy the metal which is electropositive to the others. If this metal happens to be the one which has mechanical strength it is likely that the properties of the conductor may be readily destroyed by the electrolytic action. Where steel and copper are used there will be a strong tendency to destroy the steel conductor. It is well known, however, that steel may be protected by some metal which is electropositive to it, such as zinc; hence, if the steel core is protected by zinc it will not be possible to destroy the mechanical strength of the steel as long as zinc is present. The metal, however, which protects the steel should also work well in connection with the copper. There is apparently no detrimental effect where zinc is used in contact with copper; hence, a layer of zinc between the steel core and the copper layers should provide protection.

The ordinary galvanized conductor will work so long as the galvanizing is intact. It is however, difficult to provide a sufficiently thick layer of galvanizing to insure protection. In order to make up for this deficiency, it is proposed to use a layer of metal, which will protect the steel core, between the steel core and the conducting outer layer. This may be readily accomplished by wrapping a ribbon of the proper metal around the steel core or by forming the metal in the shape of a tube which may be continuous or split. In general, it is believed that a wrapped conductor is a preferred method as this provides flexibility and the edges of the wrapping strip may be so close together that there is no chance for a galvanic action between the copper and steel core. This protecting layer may be used to advantage to increase the outside diameter of the cable and for conductivity. Even though this layer might be destroyed at certain points or may in time become useless for electrical conductivity, a considerable advantage will be gained for the period that it is present.

Fig. 1 shows one form of the invention in which the outer strands are composed of copper. The inner strands 2 greatly increase the mechanical strength of the conductor and are of suitable steel, preferably galvanized. Between the outer strands of copper 1 and the inner conductors of steel 2 is a layer of metal 3, such as zinc, which is electropositive to both the steel and the copper. This layer serves to protect the steel, even though the galvanized coating might be entirely gone in spots. The thick protecting layer 3 will increase the diameter of the conductor which is a decided advantage in decreasing corona losses where high voltages are used. This may be taken advantage of by making the layer such as to materially increase the diameter of the conductor for a given amount of material in the layer. This may be brought about by using a ribbon of deformed shape as in Fig. 2.

Figures 2, 3:
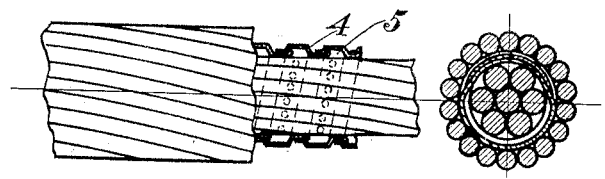
Fig. 2 is an elevation with parts in section of a fragment of conductor showing a different embodiment of the invention.
Fig. 3 is a transverse section of the conductor shown in Fig. 2.

In Fig. 2 a side elevation of the conductor is shown with parts broken away. The ribbon 4 is made with a groove 5 which increases the effective diameter for a given thickness of ribbon. Successive turns of this ribbon may over-lap so as to permit a material bending of the conductor without opening the wrapping. It is evident that this ribbon may be made in a number of ways. If the contact between the ribbon and center strands is at the center rather than at the edge of the ribbon, there will be no pockets for the retention of water. In the form shown the ribbon is perforated to permit escape of trapped moisture.

Figures 4, 5:
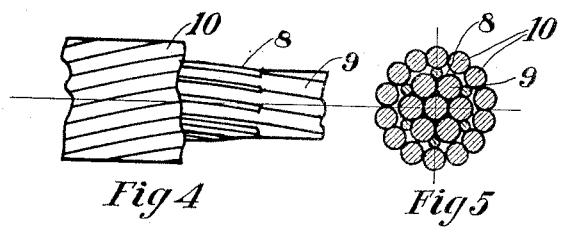
Figs. 4 and 5 are views similar to Figs. 2 and 3 showing another form of the invention.

Under some combinations of metals or under some operating conditions a slight amount of protection for the high strength steel core only is necessary. In this case the construction shown in Figs. 4 and 5 may be used to advantage. A small amount of material such as zinc or aluminum wires 8 may be distributed around or between the strands 9 of the high strength core and underneath the strands 10 of the high conducting layer. In this case, metals other than zinc may be advisable, depending upon the metals used to compose the conductor or upon the conditions in the district in which the transmission conductor is to be used. The function of the strands 8 is to protect the steel core from destruction through any electrolytic action. Although action may take place as long as electrolyte is present, this action will largely affect the protector wires 8 instead of the steel wires 9. There will be a tendency in many cases for the electrolyte to be washed out so that a relatively small amount of material will protect the conductor for a long period of time. In some cases the protecting strands may reduce corrosion of the conducting strands.

Figures 6, 7:
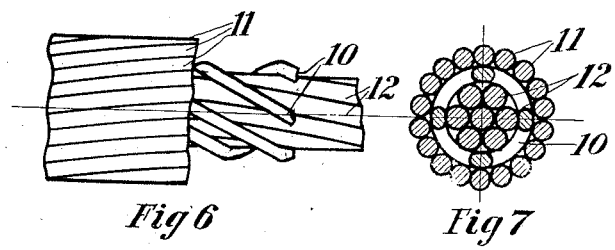
Figs. 6 and 7 are views similar to Figs. 2 and 3 showing another form of the invention.
Figures 8, 9:
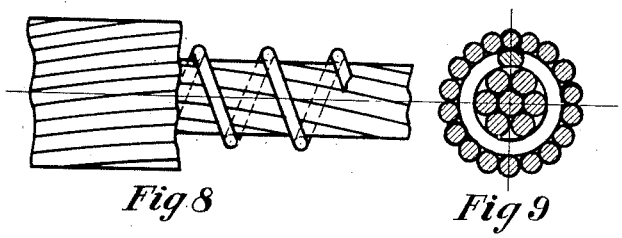
Figs. 8 and 9 are views similar to Figs. 2 and 3 showing another form of the invention.

This protection may be greatly increased and at the same time the diameter of the conductor also increased by wrapping the strands of protecting material as shown in Figs. 6 and 7. In this case, the strands 10 of protective metal are disposed along the steel core at intervals. With this arrangement the highly conducting strands 11 and the high strength strands 12 are separated, not by a continuous layer of the protective metal but by spacers or strands placed at intervals along the conductor. This protective metal may be in the form of strands wound with the same lay or a different lay from that of the other strands or may be in the form of small rings or equivalent construction.

Adjacent turns of the protecting wire or ribbon or adjacent rings need be placed only near enough together to prevent contact between the outer and inner layers or to give the necessary mechanical properties to the conductor. Where a large outer diameter is desired, the diameter may be greatly increased with a relatively small amount of protective metal by spacing the adjacent turns far apart and forming them so as to have considerable depth. The large spaces will be filled with air, any water or electrolyte being retained by capillary attraction at a point of contact between the protecting layer and inner and outer metals; hence, it will not be possible to damage the conductors owing to the presence of protective metal at this point. A long life may be brought about by providing sufficient material in the protective metal. Where the air space is large, it is evident that much less conducting metal is required for a given length of conductor. This protective metal may be in the form of a flat, rectangular, round, or deformed section. The lay may be in the same direction as the core or in an opposite direction. If in an opposite direction the point of contact is further restricted and the amount of material subject to electrolytic action will be less. It is evident that the protective metal may be formed and adjacent portions laid on in such a way that they will affect the capillary attraction in distributing the electrolyte which may be used to advantage.

In the form of the invention shown in Figs. 10 and 11 the inner high strength core, composed of strands 13, has a protecting layer of strands or ribbon 14. Outside of this layer is another layer of protecting strands 15, between the strands 14 and the high conducting strands 16. By selecting suitable material the electromotive force, which might be caused between the inner strands 13 and the outer strands 16 may be broken up into several steps of electromotive force between adjacent layers, thus, dividing the total electromotive force into successive steps through the intervening layers of protective metal. For example, the outer strands 16 might be of copper, the adjacent protective material 15 of zinc, while the protecting layer adjacent the core could be of aluminum and the high strength core of steel. The action would be far less on the aluminum in this arrangement than would be the case if the aluminum were in direct contact with the outer layer.

In the form shown in Figs. 12 and 13 the protective winding comprises wires 17 wound at spaced intervals on the high strength core wires 18 the lay being the same as the core wires but the spacing being such as to leave spaces between the core wire and the outer layer of conductor 19. This will increase the size of the conductor and provide enough material to exhaust any electrolyte that may be present on the conductor from time to time, and prevent the electrolyte from acting materially on the other strands either inner or outer.

One arrangement for distributing any electrolyte present on the conductor so as to minimize its effect is shown in Figs. 14 and 15, in which two strands 20 of protective metal are wound upon the high strength core 21 with adjacent faces sufficiently close together to form a capillary duct which draws the electrolyte away from the steel core and permits evaporation on the outside. To provide maximum life and the greatest reliability it is advisable to use a protective metal which will not be rapidly destroyed.

I claim—

1. In combination a conductor comprising separate longitudinally extending portions for providing high strength and high electrical conductivity respectively, and a detached openwork layer of protective material interposing between said portions to minimize electrolytic action between the material of said portions and to space said portions apart.

2. In combination a conductor comprising separate longitudinally extending portions for providing high strength and high electrical conductivity respectively, and protective material interposing between said portions, said protective material being electropositive relative to said high strength providing porton and having spaced portions to provide an openwork spacer between said separate longitudinally extending portions.

3. A conductor comprising a steel core, strands of copper wound upon said steel core and a strand of zinc wound upon said steel core between said core and said copper strands.

4. A conductor comprising a central high strength metal core, an outer portion of metal differing from said central core and having higher electrical conductivity than said core and a strand of metal which is electropositive relative to the metals of said core and said outer portion, said strand being wound upon said core and constituting a spacer providing openings between said core and outer portion and also providing material to support electrolytic action to protect said core and outer portion from effects of electrolyte on said conductor.

5. A conductor comprising different constituent metals subject to galvanic action in the presence of electrolyte, and metal disposed in open formation in said conductor between said constituent metals and in contact therewith, which metal is more readily subject to such action than said constituent metals for the purpose of exhausting electrolyte present on said conductor.

6. A conductor comprising a steel core, a plurality of strands of metal electropositive to steel wound upon said core and spaced from one another and strands of copper disposed outside of said first mentioned strands, said first mentioned strands serving to supply material for electrolytic action due to electrolyte lodged on said conductor and also acting to space said copper strands from said steel core.

In testimony whereof I have signed my name to this specification on this 21st day of June, A. D. 1924.

ARTHUR O. AUSTIN.